(12) United States Patent
Wölfert et al.

(10) Patent No.: US 7,833,509 B2
(45) Date of Patent: Nov. 16, 2010

(54) METHOD AND DEVICE FOR THE CONTINUOUS PRODUCTION OF HYDROGEN SULFIDE

(75) Inventors: Andreas Wölfert, Bad Rappenau (DE); Herald Jachow, Bensheim (DE); Heinz Drieβ, Ludwigshafen (DE)

(73) Assignee: BASF SE (DE)

( * ) Notice: Subject to any disclaimer, the term of this patent is extended or adjusted under 35 U.S.C. 154(b) by 0 days.

(21) Appl. No.: 12/522,189

(22) PCT Filed: Jan. 14, 2008

(86) PCT No.: PCT/EP2008/050316
§ 371 (c)(1),
(2), (4) Date: Jul. 6, 2009

(87) PCT Pub. No.: WO2008/087106
PCT Pub. Date: Jul. 24, 2008

(65) Prior Publication Data
US 2009/0317322 A1    Dec. 24, 2009

(30) Foreign Application Priority Data
Jan. 16, 2007    (EP) .................................. 07100586

(51) Int. Cl.
*B01J 12/00* (2006.01)
*C01B 17/16* (2006.01)
(52) U.S. Cl. ...................... 423/563; 423/564; 422/129; 422/160; 422/161; 422/187; 422/211; 422/222; 422/234

(58) Field of Classification Search ................. 423/563, 423/564; 422/129, 160, 161, 187, 211, 222, 422/234
See application file for complete search history.

(56) References Cited

U.S. PATENT DOCUMENTS

| | | | |
|---|---|---|---|
| 1,700,578 A | 1/1929 | Bacon | |
| 2,214,859 A | 9/1940 | Maude et al. | |
| 2,965,455 A | * 12/1960 | Maude et al. | ............... 422/160 |
| 4,332,774 A | 6/1982 | Drum et al. | |
| 4,629,617 A | 12/1986 | Voigt et al. | |

(Continued)

FOREIGN PATENT DOCUMENTS

DE              558432           9/1932

(Continued)

OTHER PUBLICATIONS

Ullmann's Encyclopaedie der Technischen Chemie, 4-th Ed., 1982, vol. 21, pp. 171-175.

(Continued)

*Primary Examiner*—Timothy C Vanoy
(74) *Attorney, Agent, or Firm*—Connolly Bove Lodge & Hutz

(57) ABSTRACT

The invention relates to a process and to an apparatus for preparing hydrogen sulfide $H_2S$ by converting a reactant mixture which comprises gaseous sulfur and hydrogen over a solid catalyst. The reactant mixture is converted at a pressure of from 0.5 to 10 bar absolute, a temperature of from 300 to 450° C. and a sulfur excess in a reactor (1). The sulfur excess corresponds to a ratio of excess sulfur to $H_2S$ prepared of from 0.2 to 3 kg of sulfur per kg of $H_2S$ prepared.

8 Claims, 1 Drawing Sheet

Figure 1:
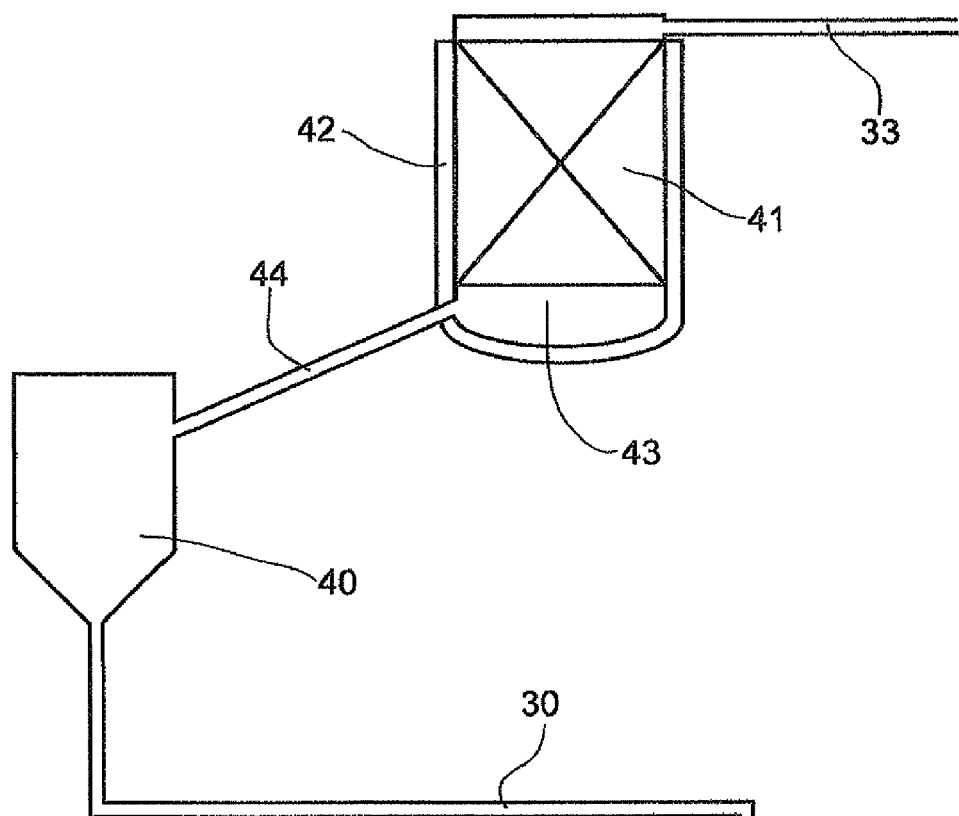
Figure 1:
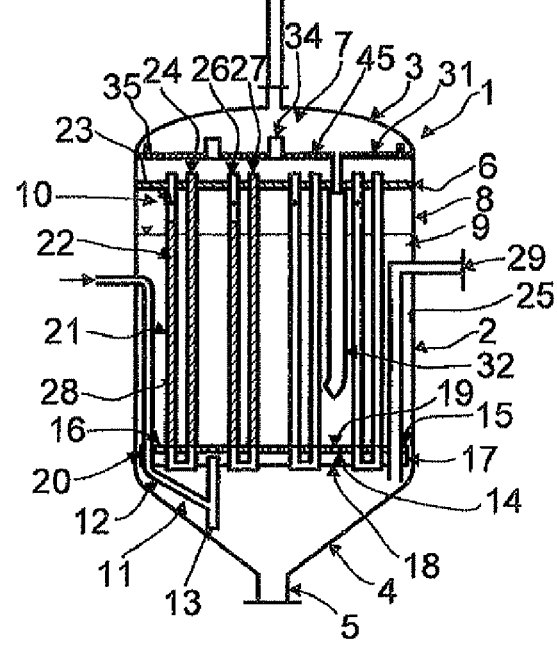

U.S. PATENT DOCUMENTS 5,173,285 A 12/1992 Takenaka et al.
5,897,850 A 4/1999 Borsboom et al.

FOREIGN PATENT DOCUMENTS

| DE | 869198 | 3/1953 |
| DE | 1113446 | 9/1961 |
| DE | 3437010 A1 | 4/1986 |
| FR | 2765808 A1 | 1/1999 |
| GB | 1193040 | 5/1970 |
| WO | WO-2004/022482 A2 | 3/2004 |
| WO | WO-2004/028963 A1 | 4/2004 |

OTHER PUBLICATIONS

Zimmermann, "Schwefelwasserstoff-Entwickler fuer das Laboratorium". Angew. Chem., vol. 74, 1962, No. 4, p. 151.

Ullmann's Encyclopedia of Industrial Chemistry, 6-th Ed., 2003, vol. 17, pp. 291-294.

* cited by examiner

METHOD AND DEVICE FOR THE CONTINUOUS PRODUCTION OF HYDROGEN SULFIDE

RELATED APPLICATIONS

This application is a national stage application (under 35 U.S.C. 371) of PCT/EP2008/050316, filed Jan. 14, 2008, which claims benefit of European application 07100586.2, filed Jan. 16, 2007.

The invention relates to a process and to an apparatus for continuously preparing hydrogen sulfide $H_2S$ by converting a reactant mixture which comprises gaseous sulfur and hydrogen over a solid catalyst.

In the prior art, hydrogen sulfide is prepared, for example, by the $H_2S$ process according to Girdler (Ullmann's Encyclopedia of Industrial Chemistry, Sixth Edition, 2003, Vol. 17, page 291). In this process, $H_2S$ is prepared in a non-catalytic manner from the elements sulfur and hydrogen in a column with internals and an essentially horizontally aligned, extended bottom. Hydrogen is introduced into the bottom filled with boiling sulfur, and strips sulfur into the ascending gas phase. Hydrogen and ascending sulfur react in the gas space of the column, and the heat of reaction released is withdrawn from the product gas by washing with liquid sulfur. To this end, liquid sulfur is drawn off from the bottom of the column, mixed with fresh cold sulfur and introduced at the top of the column. The product gas, which comprises substantially hydrogen sulfide, is cooled in two heat exchangers. A disadvantage is found to be that the process has to be performed under pressure and at elevated temperature. The elevated temperature leads to increased corrosion rates and material attrition on the reactor walls. In the case of a leak, relatively large amounts of poisonous $H_2S$ escape owing to the elevated pressure. It is also disadvantageous that the product still comprises considerable amounts of unreacted hydrogen (3% by volume) and of further impurities (2% by volume).

GB 1,193,040 relates to a process for preparing $H_2S$ from the elements at elevated temperature and elevated pressure. The reaction is performed in a column with internals, the hydrogen being supplied at the lower end of the reactor and excess molten sulfur at the upper end of the reactor. The reaction proceeds at a temperature of from 400 to 600° C. (preferably from 450 to 540° C.) and a pressure of from 4 to 15 atm (preferably from 5 to 12 atm). A disadvantage is the high temperature with regard to corrosion and the pressure for safety reasons.

U.S. Pat. No. 5,173,285 relates to a process for preparing hydrogen sulfide by reacting sulfur and hydrogen. The preparation is effected in two stages at an elevated pressure of from 0.3 to 30 kg/cm$^2$, preferably from 3 to 30 kg/cm$^2$, and a temperature between 250 and 600° C., preferably from 300 to 450° C. A disadvantage is the high pressure used in the embodiments described. A further disadvantage is the residual hydrogen content of 3.2% in the product gas.

DE 3 437 010 A1 has for its subject matter a process for preparing hydrogen sulfide from the elements. The preparation is effected in a flame at temperatures between 650 and 1300° C. The starting substances, sulfur and hydrogen, are used in a molar ratio of from 0.8 to 1.2:1, preferably in a stoichiometric ratio. A disadvantage in this process is the high temperature, which leads to increased corrosion of the plant.

FR 2 765 808 A1 is based on a further process for preparing hydrogen sulfide under pressure and at temperatures from above 350° C. to 465° C. over a catalyst with an excess of hydrogen using a double-tube countercurrent evaporator for the sulfur. In this process, the hydrogen is heated by the $H_2S$ stream from the reaction stage. The hot hydrogen releases its heat to the sulfur stream and is mixed into the sulfur which is conducted into the heat exchanger space. A portion of the $H_2S$ is recycled in order to prevent the sulfur from building up excessively high viscosities with hydrogen. A disadvantage is the relatively high level of apparatus complexity as a result of the double indirect heating. First, $H_2S$ heats the hydrogen. Then, the hydrogen heats the sulfur. A further safety disadvantage is operation under high pressure (>10 bar in the example).

U.S. Pat. No. 2,214,859 relates to a process for preparing hydrogen sulfide. The preparation is effected at a sulfur excess of from 4:2 to 1.5:2 (ratio of atomic sulfur:atomic hydrogen). The synthesis reaction is performed at from 500 to 800° C. over a catalyst comprising oxides or sulfides of cobalt, nickel or molybdenum. A disadvantage is the high energy consumption of the process as a result of lack of utilization of the heat of reaction. A further disadvantage is the high temperatures at which the reaction is performed, which lead to increased corrosion. Another disadvantage is that the conversion of the hydrogen is a maximum of 98%.

A catalytic preparation of $H_2S$ is described in Angew. Chem.; volume 74, 1962; 4; page 151. In this preparation, hydrogen is passed through an externally heated sulfur bath. The hydrogen laden with sulfur vapor passes through bores into a catalyst space. Unreacted sulfur, after leaving the catalyst space, is condensed in an upper part of the $H_2S$ outlet tube and passes via a return tube back into the sulfur bath. The catalyst space is arranged concentrically about the $H_2S$ outlet tube. A disadvantage in the process on the industrial scale is that the heat of reaction is not utilized to heat the sulfur bath, but rather the heating is effected through the jacket of the sulfur bath.

DE 1 113 446 discloses the catalytic preparation of hydrogen sulfide by converting a stoichiometric mixture of hydrogen and sulfur over a catalyst comprising cobalt salt and molybdenum salt on a support at temperatures between 300 and 400° C. The catalyst is arranged in tubes which are flowed through by the mixture of hydrogen and sulfur. The sulfur bath has a temperature of from 340 to 360° C., as a result of which a stoichiometric mixture of hydrogen and sulfur is generated by passing hydrogen through the sulfur bath for the preparation of $H_2S$. The heat of reaction released in the $H_2S$ formation is utilized by direct heat exchange, since the tubes comprising the catalyst are arranged in the sulfur bath in a manner not described in detail. In long-term operation, the process according to DE 1 113 446 does not achieve complete conversion of the hydrogen.

Further processes for preparing hydrogen sulfide are described, for example, in CS 190792 and CS 190793, although no statements are made regarding the pressure in the reactor during the synthesis reaction. A further preparation process is explained in Ullmann's Enzykiopäadie der technischen Chemie [Ullmann's Encyclopedia of Industrial Chemistry], 4th edition, volume 21, page 171.

It is an object of the present invention to provide a process and an apparatus for preparing hydrogen sulfide, which avoid the disadvantages of the prior art. In particular, it is an object of the invention to provide a process and an apparatus which enable a virtually complete conversion of the hydrogen and/or the attainment of a hydrogen sulfide purity in the crude gas stream obtained in the synthesis of ≧99.5% by volume in long-term operation.

According to the invention, this object is achieved by a process for preparing hydrogen sulfide $H_2S$ by converting a reactant mixture which comprises gaseous sulfur and hydrogen over a solid catalyst. The reactant mixture is converted at a pressure of from 0.5 to 10 bar (preferably from 0.75 to 5 bar, more preferably from 1 to 3 bar, most preferably from 1.1 to 1.4 bar) absolute, a temperature of from 300 to 450° C. (preferably from 320 to 425° C., more preferably from 330 to 400° C.) and a sulfur excess in a reactor. The sulfur excess corresponds to a ratio of excess sulfur to $H_2S$ prepared of from 0.2 to 3 kg (preferably from 0.4 to 2.2 kg, more preferably from 0.6 to 1.6 kg, most preferably from 0.9 to 1.2 kg) of sulfur per kg of $H_2S$ prepared.

As a result of the combination of the parameters selected within the ranges mentioned in the preparation of hydrogen sulfide, a purity of the crude gas stream obtained in the synthesis reaction (once the excess sulfur has been separated out in a cooler) of at least 99.5% by volume is achieved in long-term operation of the reactor. A sulfur excess alone is not sufficient to achieve a hydrogen sulfide purity of at least 99.5% by volume (as stated, for example, by U.S. Pat. No. 2,214,859). For virtually complete conversion of the hydrogen, a sulfur excess of $\geq 0.2$ kg of sulfur per kg of $H_2S$ obtained is employed. Excesses of more than 3 kg of sulfur per kg of $H_2S$ are economically unviable.

Surprisingly, the parameter combination used in the process according to the invention (in spite of low temperatures of from 300 to 450° C.) can achieve virtually complete conversion of the hydrogen (<0.5% by volume in the $H_2S$-containing crude gas stream) in long-term operation, without the sulfur excess resulting in higher stress on the catalyst.

The present invention has the advantage that hydrogen sulfide can be obtained from hydrogen and sulfur with high purity and high process reliability in a simple apparatus construction with a one-stage reaction. The synthesis reaction is performed at relatively low temperatures at which only low corrosion rates are present. The low pressures are advantageous for safety reasons. The low pressure causes, for example, only low leakage rates in the event of leaks at flanges. The process according to the invention enables energy-efficient preparation of hydrogen sulfide.

In a preferred embodiment of the present invention, the catalyst provided comprises particles which comprise at least one element selected from the group of Ni, W, Mo, Co and V (preferably Co and Mo) in oxidic or sulfidic form on a support composed of alumina or silica. The reaction of the gaseous reactants more preferably takes place over a catalyst comprising Co and Mo as the active component on alumina as a support. The use, for example, of a Co—Mo catalyst allows sufficient reaction rates to be achieved at comparatively low temperatures (<450° C.) and pressures (especially <1.5 bar absolute). The catalyst is preferably used for the present invention in the form of a fixed bed of bulk material. It is possible to use shaped bodies of any shape. The catalyst may, for example, be present in the form of cylindrical or star-shaped extrudates.

For example, the diameter of the shaped bodies is from 2 to 12 mm, in particular between 3 and 10 mm, more preferably between 4 and 8 mm, and the length is preferably between 2 and 12 mm, in particular between 3 and 10 mm, more preferably between 4 and 8 mm. The catalyst loadings in the process according to the invention are preferably from 0.08 to 1 standard $m^3$, preferably from 0.13 to 0.8 standard $m^3$, more preferably from 0.18 to 0.6 standard $m^3$, most preferably from 0.22 to 0.4 standard $m^3$ of hydrogen per hour and per kg of catalyst. Standard $m^3$ refers to the gas volume at 0° C. and 1.013 bar absolute.

In a preferred embodiment of the present invention, the conversion of the reactant mixture is performed in a one-stage reaction. In this context, one-stage reaction means that the majority of the hydrogen provided as a reactant is converted in a single reactor. The conversion of the majority means that at least 80%, preferably at least 90%, more preferably at least 95%, most preferably at least 99%, of the hydrogen is converted in the reactor. A one-stage reaction in a reactor (for example a tube bundle reactor) without a postreactor allows a simple apparatus construction to be realized. Preference is therefore given to performing the process according to the invention only with a one-stage (not with a multistage) conversion of sulfur and hydrogen Moreover, in the process according to the invention, the saturation of the reaction mixture with sulfur is preferably effected in one stage and not a plurality of stages, in order to keep the reaction structure simple.

In a preferred embodiment of the present invention, heat of reaction which arises in the conversion of the reactant mixture is utilized for evaporation of the sulfur. This achieves an energy-efficient process. The heat of reaction is preferably supplied to a sulfur melt by at least one of the following processes which provides sulfur for the reactant mixture:

A) arranging the catalyst in at least one (preferably U-shaped) tube, the reactant mixture being converted in the tube and the tube being partly in contact with the sulfur melt, B) heating gaseous hydrogen via a heat exchanger by means of thermal energy of an $H_2S$-containing crude gas stream obtained in the reactor in the conversion of the reactant mixture, and passing the heated hydrogen through the sulfur melt, and C) utilizing the thermal energy of the $H_2S$-containing crude gas stream obtained in the conversion of the reactant mixture by means of a heat exchanger to heat the sulfur melt.

In variant A), the reaction tube which comprises the catalyst over which the reaction is performed is positioned in the sulfur melts. In connection with the present invention, "being in contact" means that a heat exchange can take place between the sulfur melt and the interior of the tube through the wall of the tube. The at least one (preferably U-shaped) tube is preferably immersed partly into the sulfur melt.

A process according to variant B) can be performed, for example, as described in FR 2 765 808. The product ($H_2S$-containing crude gas stream) releases energy via a heat exchanger to hydrogen, which then heats the sulfur.

In variant C), it is also possible that the hot $H_2S$-containing crude gas stream releases heat via a heat exchanger directly to the sulfur.

In a preferred embodiment of the present invention, the reactant mixture is obtained by passing gaseous hydrogen through a sulfur melt into a reactant region of the reactor, the sulfur melt having a temperature of from 300 to 450° C., preferably from 320 to 425° C., more preferably from 330 to 400° C. As a result, sulfur is stripped by the hydrogen out of the sulfur melt into the gas phase to obtain the reactant mixture. The heat of reaction released in the exothermic reaction of $H_2S$ formation from hydrogen and sulfur preferably evaporates the liquid sulfur from the sulfur melt in the reactor. The evaporation of the sulfur is preferably supported by stripping with gaseous hydrogen introduced simultaneously into the sulfur melt, which bubbles through the liquid sulfur. The evaporation rate of the sulfur is adjusted in accordance with the invention such that the $H_2S$ synthesis reaction is performed with a sulfur excess, the sulfur excess corresponding to a ratio of excess sulfur to $H_2S$ prepared of from 0.2 to 3 kg, preferably from 0.4 to 2.2 kg, more preferably from 0.6 to 1.6 kg, most preferably from 0.9 to 1.2 kg, of sulfur per kg of $H_2S$ prepared.

It is also possible to recycle a portion of the $H_2S$-containing crude gas stream into the liquid sulfur. The recycled hydrogen sulfide can be used to strip sulfur into the gas phase. It can also serve to reduce the viscosity of the sulfur which is to be converted in the reaction. However, preference is given to a process without recycling of $H_2S$-containing crude gas in order to ensure a simple apparatus construction.

In a preferred embodiment of the present invention, an $H_2S$-containing crude gas stream passed out of the reactor is cooled in a cooler (preferably to from 114 to 165° C.) to separate out excess sulfur, and sulfur obtained in the cooler is recycled into the reactor for the preparation of $H_2S$.

The $H_2S$-containing crude gas stream passed out of the reactor preferably has a temperature of from 290 to 400° C. The excess sulfur is condensed out at least partly in the cooler. The cooling medium used may, for example, be pressurized water at 120° C. in a secondary circuit. The sulfur obtained in the cooler is preferably recycled into the reactor for preparing $H_2S$. To this end, the sulfur may be recycled by means of a special collecting and diverting construction into the sulfur melt in the jacket space of the reactor. The cooler used for the present invention is preferably a tube bundle heat exchanger.

Preference is given to providing a line between the cooler and the reactor, through which the crude gas stream is passed in one direction from the reactor into the cooler and through which the recycled sulfur is passed in an opposite direction from the cooler into the reactor.

The invention further relates to an apparatus for continuously preparing hydrogen sulfide $H_2S$, comprising a reactor for converting a reactant mixture comprising gaseous sulfur and hydrogen over a solid catalyst at a pressure of from 0.5 to 10 bar (preferably from 0.75 to 5 bar, more preferably from 1 to 3 bar, most preferably from 1.1 to 1.4 bar) absolute, a temperature of from 300 to 450° C. (preferably from 320 to 425° C., more preferably from 330 to 400° C.) and a sulfur excess which corresponds to a ratio of excess sulfur to $H_2S$ prepared of from 0.2 to 3 kg (preferably from 0.4 to 2.2 kg, more preferably from 0.6 to 1.6 kg, most preferably from 0.9 to 1.2 kg) of sulfur per kg of hydrogen sulfide prepared, and a cooler which is connected to the reactor and is for cooling an $H_2S$-containing crude gas stream passed out of the reactor to condense at least a portion of the sulfur excess, a line being arranged between the reactor and the cooler for passing the crude gas stream in a direction from the reactor into the cooler and for recycling sulfur in an opposite direction out of the cooler into the reactor. The inventive apparatus is preferably used to perform the process according to the invention.

The sulfur condensed out of the $H_2S$-containing crude gas stream in the cooler can, for example, return to the reactor at the bottom of the same tube through which the $H_2S$-containing crude gas stream is conducted out of the product region of the reactor into the cooler. This allows an additional recycle line to be avoided. This simplified pipeline design has the advantage, among others, that it is possible to dispense with two flanges which would constitute possible leakage sites from which the highly poisonous hydrogen sulfide could emerge. A further advantage is that the common line acts like a countercurrent heat exchanger in which the returning sulfur cools the hydrogen sulfide. The cooler can thus be designed for a lower cooling output. The returning sulfur cools the hydrogen sulfide actually directly downstream of entry into the product region of the reactor, so that the product region is protected from excessively hot gas zones and hence from corrosion.

It is surprising that sulfur which emerges from the reactor at, for example, 350° C., which is already of low viscosity again, and sulfur which returns at, for example, 120° C. and is not yet highly viscous can be conducted past one another in counter-current without highly viscous sulfur at 200° C. blocking the connecting tube. Although it is known that the sulfur coming from the reactor is saturated with $H_2S$ and that $H_2S$ reduces the viscosity of sulfur by about a factor of 100, this cannot be considered to be sufficient.

In a preferred embodiment of the present invention, an $H_2S$-containing crude gas stream cooled by the cooler is passed through activated carbon present in a vessel at a temperature between 114 and 165° C. (preferably from 127 to 162° C., more preferably from 135 to 160° C.) and sulfur which is obtained is collected in the bottom of the vessel.

Polysulfanes ($H_2S_x$ where $x \geq 2$) may be present as impurities in the $H_2S$-containing crude gas stream. These form, for example, within a particular temperature range in the course of cooling of a hot $H_2S$-containing crude gas stream which is passed out of a reactor in which the $H_2S$ synthesis is effected. Above 350° C., $H_2S_x$ is unstable and decomposes to sulfur and $H_2S$. In the temperature range from approx. 200 to 290° C., $H_2S$ in the crude gas stream reacts with S to give $H_2S_x$. At temperatures below 170° C., $H_2S_x$ formation does not play a significant role.

The polysulfanes present in the $H_2S$-containing crude gas stream should not precipitate in the course of cooling in the plant used to prepare the $H_2S$ and should not decompose to sulfur and $H_2S$ after a certain residence time, since sulfur deposits would be the consequence. Therefore, the $H_2S$-containing crude gas stream and the polysulfanes present therein are preferably passed through activated carbon in the vessel provided therefor, and the activated carbon acts as a catalyst for the controlled conversion of polysulfanes to $H_2S$ and sulfur. In the vessel comprising the activated carbon, sulfur is therefore obtained from the conversion of the polysulfanes, and entrained sulfur droplets or a sulfur excess provided for the synthesis may additionally occur in the crude gas stream.

Entrained sulfur droplets and the sulfur excess are, however, preferably separated out in a cooler connected upstream of the vessel.

The crude gas stream is preferably passed through the activated carbon at temperatures from 114 to 165° C., preferably from 127 to 162° C., more preferably from 135 to 160° C. The holding of the temperature of the gas stream above 114° C. during the flow through the activated carbon ensures that the sulfur obtained (from the $H_2S_x$ decomposition and, if appropriate, from the residual gas stream) remains in the melt. As a result of the holding of the temperature of the gas stream below 165° C., the viscosity of the sulfur saturated with $H_2S$ remains sufficiently low. This allows the sulfur obtained to runoff out of the activated carbon (for example an activated carbon bed) and pass into the bottom of the vessel comprising the activated carbon. The sulfur collected in the bottom can be recycled to the preparation of $H_2S$ (preferably into the reactor used for the $H_2S$ synthesis).

As a result of the continuous removal of the sulfur from the vessel comprising the activated carbon, the activated carbon is barely laden with sulfur, if at all. An exchange of the activated carbon is therefore only rarely necessary, if at all, so that a low consumption of activated carbon is achieved and disposal costs and environmental damage, for example in the case of combustion of the carbon, can be substantially avoided. Moreover, it is possible to dispense with a second vessel comprising activated carbon, to which it would be necessary to switch in the event of exchange of the activated carbon in the first vessel. The recycling of the sulfur obtained in the vessel into the synthesis reaction allows the raw material consumption to be lowered.

The sulfur obtained in the vessel comprising the activated carbon is preferably collected in the bottom of the vessel and recycled into the synthesis reaction indirectly via the cooler or directly into the reactor.

In the vessel comprising the activated carbon, any activated carbon known to those skilled in the art is usable, especially activated carbon produced from wood, bituminous coal, peat or coconut shells. It preferably comprises activated carbon particles in a size of from 2 to 15 mm, preferably from 3 to 5 mm. The activated carbon may, for example, be present in the form of small cylinders having a diameter of 4 mm. The pore volume of the activated carbon is preferably more than 30 $cm^3$100 g. The inner surface area of the activated carbon is preferably >900 $m^2$/g, more preferably >1100 $m^2$/g. The activated carbon may comprise one or more activated carbon types. For example, a first layer composed of a first activated carbon type and a second layer arranged thereon and composed of a second activated carbon type may be used in the activated carbon vessel.

The $H_2S$-containing crude gas stream is preferably passed through the vessel comprising the activated carbon with a superficial residence time of from 1 to 200 s, preferably from 2 to 100 s, more preferably from 5 to 80 s, most preferably from 10 to 50 s. The superficial velocity is preferably from 0.01 to 1 m/s, preferentially from 0.02 to 0.5 m/s, more preferably from 0.04 to 0.3 m/s, most preferably from 0.05 to 0.2 m/s. The pressure in the vessel comprising the activated carbon is preferably from 0.2 to 20 bar, preferentially from 0.4 to 10 bar, more preferably from 0.8 to 6 bar, most preferably from 1 to 5 bar absolute. At the entrance to the vessel, a gas distributor device comprising deflecting plates, inlet tubes and/or perforated inlet tubes may be provided in order to distribute the crude gas stream within the vessel.

In a preferred embodiment of the present invention, the inventive apparatus comprises a reactor for continuously preparing $H_2S$ by reacting a reactant mixture which comprises essentially gaseous sulfur and hydrogen over a catalyst, the reactor comprising a sulfur melt in a lower part of the reactor, into which gaseous hydrogen can be passed by means of a feed device. The catalyst is arranged (preferably as a fixed bed) in at least one U-shaped tube which is partly in contact with the sulfur melt, the at least one U-shaped tube having at least one entry orifice arranged above the sulfur melt in a limb through which the reactant mixture can enter the U-shaped tube from a reactant region of the reactor, having a flow path within the at least one U-shaped tube along which the reactant mixture can be converted in a reaction region in which the catalyst is arranged, and the at least one U-shaped tube having at least one exit orifice in another limb through which a product can exit into a product region (separate from the reactant region).

The reactor preferably comprises a cylindrical or prism-shaped central body surrounded by a reactor jacket which is closed at each end by a hood. The hoods may each have any suitable shape, for example be of hemispherical or conical shape.

The reactor is preferably filled with a sulfur melt in a lower part. Gaseous hydrogen can be introduced into the sulfur melt through a feed device, in which case a reactant mixture comprising essentially gaseous sulfur and gaseous hydrogen collects above the sulfur melt in a reactant region which is in contact with the sulfur melt via a phase boundary and which is delimited at the top preferably by a subdivision, for example by a plate. In a preferred embodiment of the present invention, the plate is connected to the reactor jacket in an upper part of the reactor, preferably in the upper third, more preferably in the upper quarter, of the reactor interior.

In the reactor used with preference, at least one U-shaped tube which is at least partly in contact with the sulfur melt is provided. The reactor is therefore designed as a kind of tube bundle reactor with catalyst tubes which are in a U-shaped configuration. Such a U-shaped tube has two limbs which are connected to one another by a curved region at their lower end. The U-shaped tubes may each have limbs of different lengths or preferably the same length. The U-shaped tubes may have, for example, a limb diameter between 2 and 20 cm, in particular between 2.5 and 15 cm, more preferably between 5 and 8 cm. The at least one U-shaped tube is preferably arranged vertically in the reactor, the curved region being disposed at the bottom and the two ends of the limbs at the top.

Within the at least one U-shaped tube, preference is given to arranging a catalyst for converting hydrogen and sulfur to $H_2S$, as a result of which a reaction region is provided. In connection with the present invention, the reaction region refers to that region within the U-shaped tubes in which the catalyst is disposed. The reactants are converted mainly in the reaction region which comprises the catalyst. The provision of a reaction region in U-shaped tubes allows a compact design of the reactor with regard to the reactor length, since the reaction region provided for the reaction of hydrogen with sulfur to give $H_2S$ can be divided on the two limbs of one U-shaped tube each. Use of the catalyst allows the conversion to $H_2S$ to be performed at moderate temperatures and at low pressure. The catalyst is preferably arranged in the at least one U-shaped tube in the form of a fixed bed of bulk material.

In the preparation of hydrogen sulfide using the preferred embodiment of the reactor, the reactant mixture enters from the reactant region into a limb of the at least one U-shaped tube through at least one entry orifice. The entry orifice is arranged in a limb of the at least one U-shaped tube above the sulfur melt. The entry orifice opens from the reactant region into one limb of the U-shaped tube. The distance between the phase boundary of the sulfur melt and the entry orifice of the U-shaped tube is selected such that a minimum amount of liquid sulfur is entrained in the form of droplets with the stream of the reactant mixture into the interior of the U-shaped tubes. The distance between entry orifice and phase boundary of the sulfur melt is preferably between 0.3 and 3 m, in particular between 0.6 and 2.5 m, more preferably between 0.9 and 2 m.

In the preparation of hydrogen sulfide using the preferred embodiment of the reactor, the reactant mixture flows through the U-shaped tube along a flow path, i.e. it flows first, after entry through the entry orifice, through one limb of the U-shaped tube from the top downward, enters the second limb through the curved region of the U-shaped tube and then flows through the second limb from the bottom upward. The reactant mixture is converted mainly in the reaction region which is present within the U-shaped tube, over the catalyst arranged there. Through an exit orifice in the second limb of the U-shaped tube, the gas comprising the product enters a product region (which is preferably arranged above the sulfur melt and above the reactant region in the reactor), which is separated from the reactant region (for example by a plate).

Gaseous hydrogen and liquid sulfur are fed to the reactor preferably via a suitable feed device. At a suitable point, the hydrogen sulfide product, for example at an upper hood, is passed out of the product region of the reactor.

The two limbs of a U-shaped tube are preferably each connected to a plate of the reactor at their upper end, the plate in turn being secured suitably in an upper part of the reactor on the reactor jacket. The plate subdivides the reactor preferably into two subregions; in particular, it determines a product region above it. The preferred securing of the at least one U-shaped tube on a plate connected to the reactor jacket allows thermal longitudinal changes of the reactor and of the U-shaped tubes independently of one another, since the U-tube bundle is secured on the jacket of the reactor only via the plate, so that it is possible to dispense with compensators in the construction of the reactor. The connection of the U-shaped tubes to the plate at the upper ends of their limbs advantageously achieves the effect that the tubes become stabilized according to gravity.

In a preferred embodiment of the present invention, a plate which divides the reactor interior into a lower subregion below it and an upper subregion above it is arranged in an upper section of the reactor, preferably close to the upper hood.

The upper subregion preferably comprises the product region, which comprises mainly the hydrogen sulfide product during the operation of the reactor. In each case one limb of the U-shaped tubes is an open connection with the product region.

The lower subregion of the reactor preferably comprises the reactant region directly below the plate and, below it, a sulfur melt into which liquid sulfur is fed from an external source and/or as reflux. Some of the U-shaped tubes are in thermal contact with the sulfur melt; some of them are preferably arranged directly within the sulfur melt, i.e. are immersed into the sulfur melt. A transfer of the heat energy released in the exothermic reaction to give $H_2S$ thus takes place via the at least one U-shaped tube into the surrounding sulfur melt. The heat of reaction is utilized for an evaporation of the sulfur present therein. This thermal coupling enables an energetically favorable process in which external heat supply can be reduced considerably or is not necessary. At the same time, overheating of the catalyst can be avoided, which increases the lifetimes of the catalyst.

For a good transfer of the heat energy, preference is given to minimizing the heat resistance of the catalyst bed in the reaction region. For the conversion of the reactants to $H_2S$, preference is given to providing a multitude of catalyst-comprising U-shaped tubes, so that the particular path from the core of the catalyst bed to the wall of the tube is low. A ratio of the sum of the cross-sectional areas of all catalyst tubes (or all limbs of the U-shaped catalyst tubes) based on the cross-sectional area of the (preferably cylindrical) reactor body is preferably between 0.05 and 0.9, especially between 0.15 and 0.7, more preferably between 0.2 and 0.5, most preferably between 0.25 and 0.4.

In order that there is sufficient thermal contact for the heat transfer from the U-shaped tube into the surrounding sulfur melt, the aim is that from 20 to 100% of the outer jacket area of a particular U-shaped tube along the reaction region comprising the catalyst is in contact with the sulfur melt. In order that the heat transfer into the sulfur melt functions efficiently, wherever the reaction takes place in the U-shaped tube, the outer jacket area of the U-shaped tube along the reaction region comprising the catalyst should be surrounded by the sulfur melt to an extent of more than 20%, preferably to an extent of more than 50%, more preferably to an extent of more than 80%. In the case of too low a fill level of the sulfur melt in the reactor and hence too low a contact of U-shaped tube and sulfur melt, there is the risk that the heat of reaction is not removed sufficiently.

In flow direction of the reactant mixture, within the at least one U-shaped tube, the reactant mixture, after entry into the U-shaped tube, can first flow through an inert bed, in which case any entrained liquid sulfur present in the form of droplets is separated out of the reactant mixture at this inert bed. For example, a proportion of liquid sulfur in the reactant mixture comprising gaseous hydrogen and sulfur of up to 100 000 ppm by weight may be present. For the separating-out of the sulfur droplets, a proportion of the inert bed, based on the overall bed composed of inert bed and catalyst bed, of from 1 to 30%, especially from 2 to 25%, preferably from 5 to 20%, more preferably from 8 to 16%, is preferably provided in the at least one U-shaped tube. The inert bed may consist of bodies of any shape, for example of saddles or preferably of spheres which are composed of a suitable material, for example zirconium oxide or preferably aluminum oxide.

Preference is given to introducing gaseous hydrogen into the sulfur melt in the reactor by means of a feed device and to distributing it by means of a distributor device.

The feed device preferably comprises a tube which is open at both ends and is arranged vertically in the reactor, and which is arranged below the distributor device and whose upper end projects preferably into the space which is defined by the distributor plate and the edge which extends downward, into the hydrogen bubble. Projection into the space below the distributor plate and especially into the hydrogen bubble formed below it advantageously prevents inhomogeneous hydrogen introduction into the sulfur melt.

An inlet tube which runs obliquely, through which the hydrogen is introduced from outside the reactor, preferably opens into the vertical tube of the feed device. The feed device is advantageously configured such that sulfur which enters the tube arranged vertically can flow freely downward without blocking the feed device for the hydrogen. The hydrogen rises upward within the tube arranged vertically and collects below the distributor device.

The distributor device preferably comprises a distributor plate which is arranged horizontally in the reactor and has passage orifices and an edge extending downward. The preferably flat distributor plate extends preferably virtually over the entire cross-sectional area of the reactor, a gap remaining between reactor jacket and distributor device. The gap between the edge of the distributor device and the reactor jacket preferably has a width between 1 and 50 mm, in particular between 2 and 25 mm, more preferably between 5 and 10 mm. The shape of the distributor plate is guided by the geometry of the reactor in which it is arranged. It may preferably have a circular or polygonal shape or any other desired shape. Recesses may preferably be provided on the outer circumference of the distributor plate, which provide passage orifices, for example, for hydrogen introduction, sulfur introduction and sulfur recycling. The gap between distributor device and reactor jacket may thus have only a small width, so that severe vibration of the distributor device in the reactor is avoided. The hydrogen introduced below the distributor device accumulates below this distributor plate to form a hydrogen bubble in the space which is defined by the edge extending downward and the distributor plate. The distributor plate is preferably arranged horizontally in the reactor, so that the hydrogen bubble which accumulates below the distributor plate has virtually constant height. As a result of the passage orifices in the distributor plate, the accumulated hydrogen is dispersed with uniform distribution from the hydrogen bubble into the sulfur melt disposed above of the distributor plate. The number of passage orifices in the distributor plate is guided by factors including the volume flow rate of the hydrogen introduced and is preferably from 2 to 100, especially from 4 to 50, more preferably 8 to 20, per 100 standard $m^3/h$. The passage orifices may, for example, be circular or defined as slots, preferred diameters or slot widths being from 2 to 30 mm, preferably from 5 to 20 mm, more preferably from 7 to 15 mm. The passage orifices are preferably arranged regularly in the distributor plate. The areal proportion of the passage orifices, based on the area of the distributor plate, is preferably between 0.001 and 5%, preferentially between 0.02 and 1%, more preferably between 0.08 and 0.5%.

In order to ensure good mixing of the sulfur melt by the ascending hydrogen and thus to ensure very efficient stripping of the sulfur into the ascending hydrogen, the gas velocity of the hydrogen dispersed by the passage orifices is preferably from 20 to 500 m/s, especially from 50 to 350 m/s, preferably from 90 to 350 m/s, more preferably from 150 to 250 m/s.

When there is penetration of sulfur into the passage orifices, which solidifies within the passage orifices, especially in the case of lowering of the temperature, the hydrogen distribution at the distributor device through the passage orifices is inhibited. The accumulated hydrogen can then also disperse into the sulfur melt via the edge region of the edge which extends downward, in which case the hydrogen from the hydrogen bubble is then distributed within the sulfur melt present in a gap between distributor device and reactor jacket. The edge region of the distributor device is preferably configured in serrated form, as a result of which the hydrogen accumulated below it is distributed in fine gas bubbles.

In the case of simple introduction of hydrogen, for example, via a vertical inlet tube without such a distributor device into the sulfur melt, an inhomogeneous hydrogen distribution can arise. In the vicinity of the inlet tube, large bubbles of hydrogen rise within the sulfur melt. In other regions of the sulfur melt, there is then barely any hydrogen. As a result, vibrations of the U-shaped tubes can be induced. The distributor device which is preferably present in the inventive reactor and is configured like a bell open at the bottom therefore also serves to stabilize the U-shaped tubes of the tube bundle in the preferred embodiment of the reactor.

In order to achieve greater stability of the U-shaped tubes, the at least one U-shaped tube may be connected to the distributor device close to its lower curved region, said distributor device limiting the vibration region of the U-shaped tube or of the corresponding tube bundle in the horizontal direction through its dimensions. In this case, the distributor device is in turn not connected directly to the reactor jacket of the reactor, but rather is connected indirectly to the reactor jacket via the connection of the U-shaped tubes to the plate. As a result, problems due to stresses between reactor, U-shaped tubes and distributor device caused by the thermal changes in length are avoided.

In one embodiment, the distributor plate is connected to the particular limbs of the at least one U-shaped tube close to the lower end of the U-shaped tube, for example welded, a section of the U-shaped tube which comprises at least part of the curved region being disposed below the distributor plate. Since this section of the U-shaped tube is not in contact with the sulfur melt but rather projects into the region of the hydrogen bubble accumulated below the distributor device, the U-shaped tube in this section preferably does not comprise any catalyst bed. There is thus no conversion to $H_2S$ and no exothermic heat of reaction to be removed arises. Within the at least one U-shaped tube, subdivisions may be provided, which separate the region of the catalyst bed from the region without bed, although the subdivisions have to be permeable for reactants and products for the $H_2S$ preparation.

In the present invention, a feed device and a distributor device for gaseous hydrogen are preferably provided in a lower section of the reactor, for example close to the lower hood. The hydrogen introduced into the sulfur melt by means of the feed device rises in the form of gas bubbles distributed by the distributor device through the melt, which strips sulfur out of the melt, and accumulates (for example below an upper plate of the reactor) in the reactant region of the reactor as a reactant mixture which is in contact with the sulfur melt via a phase boundary.

The process according to the invention for continuously preparing $H_2S$ comprises the conversion of a reactant mixture which comprises essentially gaseous sulfur and hydrogen over a solid catalyst (heterogeneous reaction), wherein a sulfur melt is preferably provided at least in a lower region of the reactor into which gaseous hydrogen is introduced. In the process, the reactant mixture may, for example, be introduced from a reactant region into a limb of at least one U-shaped tube through at least one entry orifice arranged above the sulfur melt, passed along a flow path through the at least one U-shaped tube which is partly in contact with the sulfur melt, and converted over a catalyst arranged in a reaction region in the flow path. A product can be passed out of at least one exit orifice in another limb of the U-shaped tube into a product region (preferably separated from the reactant region). The $H_2S$ synthesis is preferably performed in the reactor already described.

The preferred process for synthesizing $H_2S$ is performed in the reactor at temperatures of the reactant mixture and of the reactant region comprising the catalyst of from 300 to 450° C., preferably from 320 to 425° C., more preferably from 330 to 400° C., which minimizes the corrosion stress on the materials selected for the construction elements. The temperature of the sulfur melt is preferably between 300 and 450° C., especially between 320 and 425° C., preferably between 330 and 400° C., more preferably between 350 and 360° C. The temperature in the reactant space above the sulfur bath is preferably between 300 and 450° C., especially between 320 and 425° C., preferably between 330 and 400° C., more preferably between 350 and 380° C. The product mixture which exits from the reaction region into the product space preferably has a temperature between 300 and 450° C., especially between 320 and 425° C., preferably between 330 and 400° C., more preferably between 350 and 360° C. The pressures in the jacket space of the reactor and in the interior of the U-shaped tubes are from 0.5 to 10 bar, preferably from 0.75 to 5 bar, more preferably from 1 to 3 bar, most preferably from 1.1 to 1.4 bar absolute.

The hydrogen introduced into the reactor in the preferred process is preferably dispersed into the sulfur melt at a distributor device provided in the lower section of the reactor. Firstly, the hydrogen is distributed preferably by means of a distributor plate of the distributor apparatus which is arranged horizontally within the reactor through the passage orifices provided therein from a hydrogen bubble accumulated below it into the sulfur melt present above the distributor plate. When there is inhibition of the passage of the hydrogen through the passage orifices, for example by sulfur deposited therein, the hydrogen bubble accumulates within the space defined by the distributor plate and the edge of the distributor device which extends downward, so that, secondly, hydrogen is distributed by means of the edge region of the edge which extends downward into the sulfur melt surrounding it. In this case, hydrogen passes from the hydrogen bubble under the distributor device through a gap between distributor device and reactor jacket into the sulfur melt present above the distributor device. In this way, it is ensured that the hydrogen is distributed within the sulfur melt in a sufficient amount during the continuous preparation of $H_2S$.

The evaporation rate of the sulfur in the present invention is adjusted such that the reactant mixture comprises a sulfur excess. The excess sulfur is then fed out of the product region of the reactor with the product and subsequently separated out as a melt. This liquid sulfur can, for example, be recycled via a collecting and diverting construction arranged in the upper subregion of the reactor, comprising, inter alia, a collecting tray and a return tube which proceeds therefrom and is immersed into the sulfur melt, into the sulfur melt present in the lower subregion of the reactor. The $H_2S$ gases leaving the reactor are preferably cooled in a heat exchanger which serves as a cooler, the excess sulfur being condensed out and passed back into the sulfur melt via the collecting and diverting construction. The cooling medium used may be warm pressurized water in a secondary circuit.

In a preferred embodiment of the process according to the invention, this comprises the steps of reacting gaseous sulfur and hydrogen over a solid catalyst in a reactor with a sulfur excess to obtain an $H_2S$-containing crude gas stream, cooling the crude gas stream to from 114 to 165° C., preferably from 127 to 163° C., more preferably from 135 to 161° C., in a cooler to separate out excess sulfur and passing the crude gas stream from the cooler into a vessel comprising activated carbon.

In a preferred embodiment of the present invention, the sulfur collected in the bottom of the vessel comprising the activated carbon is recycled into the reactor via the cooler. To this end, a line is provided between the cooler and the vessel comprising the activated carbon, through which the crude gas stream is passed in one direction from the cooler into the vessel and through which sulfur collected in the bottom of the vessel is passed in an opposite direction from the vessel into the cooler. The sulfur which forms in the vessel, for example in the decomposition of $H_2S_x$, runs out of the activated carbon (for example an activated carbon bed) and is collected in the bottom of the vessel. The temperatures in the vessel are selected such that the sulfur is liquid and can therefore flow into the bottom and from there into the line to the cooler. The arrangement of a single line between the vessel comprising the activated carbon and the cooler for conducting the cooled crude gas stream in one direction from the cooler into the vessel and for recycling sulfur in the opposite direction from the bottom of the vessel into the cooler in turn dispenses with flanges which may constitute possible leakage sites. The pipeline system is simplified.

The lines in the device which conduct liquid or gaseous sulfur, especially the line between the vessel comprising the activated carbon and the cooler, between reactor and cooler and/or the sulfur feed line of the reactor, are preferably configured with gradients. Moreover, these lines are preferably designed with heating to from 100 to 170° C. A suitable method for this purpose is the use of jacketed lines or the wrapping of the lines with heatable corrugated tubes or electrical trace heating. Preference is given to using jacketed lines or corrugated tubes. Suitable heating media in the jacket or in the corrugated tube are, for example, steam or liquid water.

The invention will be illustrated in detail below with reference to the drawing.

The drawing shows:

FIG. 1 a schematic illustration of a preferred embodiment of an inventive apparatus.

The apparatus according to FIG. 1 is suitable for performing the process according to the invention. It comprises a reactor 1 for converting sulfur and hydrogen, a cooler 40 connected to the reactor 1 for cooling an $H_2S$-containing crude gas stream passed out of the reactor 1 to from 114 to 165° C., and a vessel 42 which comprises activated carbon 41, is connected to the cooler 40 and has a bottom 43 for collecting sulfur which is obtained in the vessel 42 at from 114 to 165° C. from a crude gas stream comprising polysulfane. A line 44 is connected to the bottom 43 of the vessel 42 and opens into the cooler 40 for the recycling of sulfur (via the cooler 40) into the reactor 1.

The reactor 1 is closed with hoods 3, 4 at both ends of a cylindrical body 2. At the upper hood 3, a product can be drawn off. At the lower hood 4 is disposed a discharge stop 5 in order possibly to completely discharge the contents of the reactor 1. In an upper section of the reactor 1, a plate 6 is provided, which separates an upper subregion comprising a product region 7 from a lower subregion 8. The plate 6 is connected to a reactor jacket 25 of the reactor 1. The lower subregion 8 is filled partly with a sulfur melt 9 which is in contact via a phase boundary with a reactant region 10 which is bordered at the top by the plate 6. The reactant region 10 comprises mainly gaseous hydrogen and sulfur.

The hydrogen is introduced into the sulfur melt 9 via a feed device 11 into a lower section of the reactor 1, for example in the lower hood 4. The feed device 11 comprises a line 12 which runs obliquely and opens laterally into a tube 13 which is arranged vertically in the reactor 1 and is open at the top and bottom. The upper end of the tube 13 projects into a space 14 which is bordered by a distributor device 15. The distributor device 15 comprises a distributor plate 16 arranged horizontally in the reactor 1 and an edge 17 which extends downward and has a preferably serrated edge region 18. The hydrogen introduced via the feed device 11 rises upward within the vertical tube 13 and collects below the distributor plate 16 to form a hydrogen bubble. Passage orifices 19 in the distributor plate 16 disperse the hydrogen in the sulfur melt 9 present above it, and it rises upward in the form of gas bubbles within the sulfur melt 9, which strips sulfur out of the sulfur melt 9. This forms a reactant mixture comprising gaseous hydrogen and sulfur in the reactant region 10 above the sulfur melt 9.

When the passage orifices 19 in the distributor plate 16 for hydrogen passage are blocked, the hydrogen can also be dispersed from the hydrogen bubble accumulated below the distributor plate 16 via the edge region 18 into a gap 20 between the reactor jacket 25 and the edge 17 of the distributor device 15 into the sulfur melt 9.

Arranged within the cylindrical body of the reactor 1 are tubes 21 which have a U-shaped design. The U-shaped tubes 21 are connected to the plate 6 by their two limbs 26, 27. The connection of the limbs 26, 27 to the plate 6 can be established by weld seam. The U-shaped tubes 21 are immersed partly into the sulfur melt 9, which gives rise to the possibility of direct heat exchange between the interior of the tubes 21 and the sulfur melt 9 via the outer jacket surface 28 of the tubes 21. Within each U-shaped tube 21 is arranged a fixed catalyst bed 22 which is provided in the two limbs 26, 27 of the U-shaped tubes 21.

As shown in FIG. 1, the distributor device 15 is connected to the U-shaped tubes 21, and a portion and especially the transition from one limb 26 to the second limb 27 of the particular U-shaped tubes 21 runs below the distributor plate 16 through the space 14. Since this section of the U-shaped tubes 21 projects into the accumulated hydrogen bubble and is not in direct contact with the sulfur melt 9, this section does not comprise any catalyst. The gap 20 is positioned between the distributor device 15 and the reactor jacket 25. The distributor device 15 is not connected directly to the reactor jacket 25.

In the reactor 1, the synthesis of hydrogen sulfide proceeds as follows. A reactant mixture passes from the reactant region 10 through one or more entry orifices 23 arranged on the circumference of a limb 26 of each of the U-shaped tubes 21 into the interior of one limb 26 of the U-shaped tube 21, flows through the catalyst bed 22 present therein, which may be supplemented by an upstream inert bed, and is converted substantially to hydrogen sulfide along the flow path within the reaction region comprising fixed catalyst bed 22.

The reactant mixture is converted in the reactor 1 at a pressure of from 0.5 to 10 bar (most preferably from 1.1 to 1.4 bar) absolute, a temperature of from 300 to 450° C. and a sulfur excess. The sulfur excess corresponds to a ratio of excess sulfur to hydrogen sulfide prepared of from 0.2 to 3 kg of sulfur per kg of hydrogen sulfide prepared.

The product passes out of the second limb 27 via at least one exit orifice 24 into the product region 7 and can be collected and discharged from there via hood 3. As a result of the direct contact of the U-shaped tubes 21 with the sulfur melt 9, the heat of reaction released in the conversion to $H_2S$ is released from the fixed catalyst bed 22 into the sulfur melt 9 via the outer jacket surface 28 of the U-shaped tubes along the reaction region, and it is utilized for sulfur evaporation.

In order to keep the sulfur melt 9 at about the same height during the process, gaseous hydrogen and liquid sulfur are fed in appropriate amounts to the reactor 1 continuously via the feed device 11 and a sulfur inlet 29.

Between the reactor 1 and the cooler 40 is arranged a first line 30 which serves to pass the crude gas stream from the reactor 1 into the cooler 40 and to recycle sulfur in the opposite direction from the cooler 40 into the reactor 1. The liquid sulfur passes out of the first line 30 to a collecting and diverting construction 45 arranged in the upper subregion of the reactor 1. This collecting and diverting construction 45 comprises a collecting tray 31, on which inlet stubs 34 are arranged for passing the product from the product region 7 disposed below the collecting tray 31 into the product region 7 disposed below it, and an edge 35. The liquid sulfur separated out is collected on a collecting tray 31 which is arranged horizontally in the product region 7 of the reactor 1, and recycled via a return tube 32 immersed into the sulfur melt 9 into the sulfur melt 9 present in the lower subregion of the reactor 8. The reactor 1 is preferably insulated, so that the energy consumption is at a minimum.

In the cooler 40, the $H_2S$-containing crude gas stream stemming from the reactor 1 is cooled from approx. 350° C. to from 114 to 165° C. This condenses out excess sulfur, which passes through the first line 30 into the reactor 1. In the cooler 40, conditions are present under which polysulfanes ($H_2S_x$) can form. From the cooler 40, an $H_2S$-containing crude gas stream which comprises polysulfanes is passed through the second line 44 into the vessel 42 comprising the activated carbon 41. The second line 44 arranged between the vessel 42 comprising the activated carbon 41 and the cooler 40 serves both for the passage of the cooled crude gas stream in one direction from the cooler 40 into the vessel 42, and for the recycling of sulfur in the opposite direction from the bottom 43 of the vessel 42 into the cooler 40.

The $H_2S$-containing stream purified by means of the activated carbon 41 is discharged from the vessel 42 via a further line 33.

EXAMPLE 451 kg/hr of sulfur are introduced in liquid form at a temperature of 144° C. into the jacket space of a tube bundle reactor. Simultaneously, 28.2 kg/hr of hydrogen are introduced. The insulated tube bundle reactor is heated with an electrical trace heater which introduces 16 kW. The heat losses through the insulation of the reactor are 4 kW. The sulfur in the reactor is at such a level that the reaction tubes, in the regions where they comprise catalyst, are surrounded by sulfur. In the sulfur bath, the nitrogen bubbling through is saturated with sulfur. The heat needed for this purpose stems from the reaction tubes which are surrounded by the sulfur bath. In the gas space, a temperature of 360° C. is present above the sulfur bath. The catalyst used is a Co—Mo catalyst on a support of alumina. The sulfur-laden hydrogen is passed into the reaction tubes, where the conversion to hydrogen sulfide takes place at a temperature of from 360 to 450° C. The catalyst loading is 0.3 standard $m^3$ of hydrogen/hr/kg of catalyst. At the walls of the apparatus, temperatures of from 350 to 380° C. are measured. The pressure in the reactor is 1.2 bar absolute. The gas mixture which leaves the reactor and consists of hydrogen sulfide, the excess sulfur vapors and of traces of unconverted hydrogen has a temperature of 358° C. The gas mixture which leaves the reactor is partly condensed in the downstream heat exchanger. The hydrogen sulfide stream which leaves the condenser has a temperature of 137° C. The condensed liquid sulfur which is obtained at a temperature of 150° C. is recycled into the jacket space of the reactor. 480 kg/hr of $H_2S$ form with a purity of more than 99.5% by volume. In the course of operation of the plant over a time of 0.5 year, no changes in the parameters are needed to achieve a purity of the $H_2S$ of 99.5% by volume. The energetic assessment of the reactor and of the partial condenser shows that 477 kg/hr of liquid sulfur are simultaneously recycled from the partial condenser into the reactor. The established ratio of recycled sulfur to hydrogen sulfide formed is 0.99 kg of sulfur per 1 kg of hydrogen sulfide.

| Reference numeral list |
| --- |
| 1 Reactor |
| 2 Reactor body |
| 3 Upper hood |
| 4 Lower hood |
| 5 Outlet stub |
| 6 Plate |
| 7 Product region |
| 8 Lower subregion of reactor |
| 9 Sulfur melt |
| 10 Reactant region |
| 11 Feed device for hydrogen |
| 12 Line |
| 13 Tube arranged vertically |
| 14 Space |
| 15 Distributor device |
| 16 Distributor plate |
| 17 Edge |
| 18 Edge region |
| 19 Passage orifices |
| 20 Gap |
| 21 Tubes |
| 22 Fixed catalyst bed |
| 23 Entry orifice |
| 24 Exit orifice |
| 25 Reactor jacket |
| 26 First limb |
| 27 Second limb |
| 28 Outer jacket surface |
| 29 Sulfur inlet |
| 30 First line |
| 31 Collecting tray |
| 32 Return tube |
| 33 Line |
| 34 Inlet stub |
| 35 Edge |
| 40 Cooler |
| 41 Activated carbon |
| 42 Vessel |
| 43 Bottom |
| 44 Second line |
| 45 Collecting and diverting construction |

The invention claimed is:

1. A process for preparing hydrogen sulfide $H_2S$ by converting a reactant mixture which comprises gaseous sulfur and hydrogen over a solid catalyst (22), which comprises converting the reactant mixture at a pressure of from 0.5 to 10 bar absolute, a temperature of from 300 to 450° C. and a sulfur excess in a reactor, the sulfur excess corresponding to a ratio of excess sulfur to $H_2S$ prepared of from 0.2 to 3 kg of sulfur per kg of $H_2S$ prepared, wherein the reactant mixture is obtained by passing gaseous hydrogen through a sulfur melt (9) into a reactant region (10) of the reactor (1), the sulfur melt (9) having a temperature of from 300 to 450° C., wherein a line (30) is provided between the cooler (40) and the reactor (1), through which, the crude gas stream is passed in a direction from the reactor (1) into the cooler (40) and through which the recycled sulfur is passed in an opposite direction from the cooler (40) into the reactor (1).

2. The process according to claim 1, wherein the catalyst (22) provided comprises particles which comprise at least one element selected from the group of Ni, W, Mo, Co and V in oxidic or sulfidic form on a support composed of alumina or silica.

3. The process according to claim 1, wherein the conversion of the reactant mixture is performed in a one-stage reaction.

4. The process according to claim 1, wherein heat of reaction which arises in the conversion of the reactant mixture is utilized for evaporation of the sulfur.

5. The process according to claim 4, wherein the heat of reaction is supplied to a sulfur melt (9) which provides sulfur for the reactant mixture by at least one of the following processes:

A) arranging the catalyst (22) in at least one tube (21), the reactant mixture being converted in the tube (21) and the tube (21) being partly in contact with the sulfur melt (9), B) heating gaseous hydrogen via a heat exchanger by means of thermal energy of an $H_2S$-containing crude gas stream obtained in the reactor (1) in the conversion of the reactant mixture, and passing the heated hydrogen through the sulfur melt (9), and C) utilizing the thermal energy of the $H_2S$-containing crude gas stream obtained in the conversion of the reactant mixture by means of a heat exchanger to heat the sulfur melt (9).

6. The process according to claim 1, wherein an $H_2S$-containing crude gas stream passed out of the reactor (1) is cooled in a cooler (40) to separate out excess sulfur, and sulfur obtained in the cooler (40) is recycled into the reactor (1) for the preparation of $H_2S$.

7. The process according to claim 6, wherein an $H_2S$-containing crude gas stream cooled by the cooler is passed through activated carbon (41) present in a vessel (42) at a temperature between 114 and 165° C., and sulfur obtained is collected in the bottom (43) of the vessel (42).

8. An apparatus for continuously preparing hydrogen sulfide $H_2S$, comprising a reactor (1) for converting a reactant mixture comprising gaseous sulfur and hydrogen over a solid catalyst (22) at a pressure of from 0.5 to 10 bar absolute, a temperature of from 300 to 450° C. and a sulfur excess which corresponds to a ratio of excess sulfur to $H_2S$ prepared of from 0.2 to 3 kg of sulfur per kg of $H_2S$ prepared, and a cooler (40) which is connected to the reactor (1) and is for cooling an $H_2S$-containing crude gas stream passed out of the reactor (1) to condense at least a portion of the sulfur excess, a line (30) being arranged between the reactor (1) and the cooler (40) for passing the crude gas stream in a direction from the reactor (1) into the cooler (40) and for recycling sulfur in an opposite direction out of the cooler (40) into the reactor (1).

* * * * *